United States Patent
Stevenson et al.

(10) Patent No.: US 12,516,630 B1
(45) Date of Patent: Jan. 6, 2026

(54) SYSTEM AND METHOD FOR FUEL INJECTION IN TURBINE SECTION OF GAS TURBINE ENGINE

(71) Applicant: GE Infrastructure Technology LLC, Greenville, SC (US)

(72) Inventors: Christian Xavier Stevenson, Mountville, SC (US); Joel Meador Hall, Simpsonville, SC (US); Jonathan Dwight Berry, Simpsonville, SC (US); Michael John Hughes, Pittsburgh, PA (US); Robert Frank Hoskin, Lawrenceville, GA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/044,501

(22) Filed: Feb. 3, 2025

(51) Int. Cl.
*F02C 7/22* (2006.01)
*F01D 5/14* (2006.01)
*F01D 9/06* (2006.01)
*F02C 3/16* (2006.01)
*F02C 3/20* (2006.01)
*F02C 3/30* (2006.01)
(Continued)

(52) U.S. Cl.
CPC ............ *F02C 7/22* (2013.01); *F01D 5/143* (2013.01); *F01D 9/06* (2013.01); *F02C 3/16* (2013.01); *F02C 3/20* (2013.01); *F02C 3/30* (2013.01); *F02C 6/003* (2013.01); *F02K 3/08* (2013.01); *F23R 3/28* (2013.01); *F23R 3/34* (2013.01); *F23R 3/36* (2013.01); *F02C 3/34* (2013.01); *F02C 6/18* (2013.01); *F23N 1/00* (2013.01); *F23N 2241/20* (2020.01); *F23R 3/286* (2013.01); *F23R 3/346* (2013.01); *F23R 2900/00002* (2013.01); *F23R 2900/00015* (2013.01)

(58) Field of Classification Search
CPC ...... F02C 3/20; F02C 3/34; F02C 6/18; F02C 7/22; F02C 3/16; F02C 3/30; F02C 6/003; F23R 3/28; F23R 3/34; F23R 3/36; F23R 3/286; F23R 3/346; F23R 2900/00002; F23R 2900/00015; F23N 1/00; F23N 2241/20; F01D 5/143; F01D 9/06; F02K 3/08
USPC .......................................................... 60/735
See application file for complete search history.

(56) References Cited

U.S. PATENT DOCUMENTS

2,272,676 A * 2/1942 Leduc ...................... F02C 3/16
60/726
2,735,612 A * 2/1956 Hausmann .............. F01D 5/143
415/199.5
(Continued)

*Primary Examiner* — Jason H Duger
(74) *Attorney, Agent, or Firm* — Fletcher Yoder, P.C.

(57) ABSTRACT

A system includes at least one component of a turbine section. The at least one component includes an inert gas port formed into a wall of the at least one component. The inert gas port is configured to inject an inert gas into a chamber of the turbine section in a downstream direction. The at least one component also includes a fuel port formed into the wall upstream of the inert gas part. The fuel port is configured to inject a fuel in the downstream direction toward the injected inert gas. The inert gas causes the injected fuel to be lifted away from the surface of the wall and propelled into the hot gas flow path, where the fuel can be ignited by the combustion gases to increase gas turbine engine efficiency and performance.

20 Claims, 7 Drawing Sheets (51) Int. Cl.
    *F02C 6/00*         (2006.01)
    *F02K 3/08*         (2006.01)
    *F23R 3/28*         (2006.01)
    *F23R 3/34*         (2006.01)
    *F23R 3/36*         (2006.01)
    *F02C 3/34*         (2006.01)
    *F02C 6/18*         (2006.01)
    *F23N 1/00*         (2006.01)

(56) References Cited

U.S. PATENT DOCUMENTS

| | | | | |
|---|---|---|---|---|
| 3,037,351 | A * | 6/1962 | Stoltz | F02C 3/16 60/735 |
| 3,751,911 | A * | 8/1973 | De Tartaglia | F23R 3/54 60/758 |
| 3,752,172 | A | 8/1973 | Cohen et al. | |
| 4,893,468 | A * | 1/1990 | Hines | F02C 3/30 60/762 |
| 5,002,483 | A * | 3/1991 | Becker | F23M 5/085 431/352 |
| 7,415,827 | B2 | 8/2008 | Bertolotti et al. | |
| 7,658,076 | B2 | 2/2010 | Hoffmann | |
| 8,104,286 | B2 | 1/2012 | Zuo et al. | |
| 8,176,739 | B2 * | 5/2012 | Evulet | F23R 3/34 60/737 |
| 10,760,793 | B2 | 9/2020 | Patel et al. | |
| 2008/0134685 | A1 * | 6/2008 | Bunker | F23R 3/20 60/776 |
| 2010/0024426 | A1 * | 2/2010 | Varatharajan | F23R 3/34 60/737 |
| 2010/0095675 | A1 * | 4/2010 | Lacy | F23R 3/14 60/737 |
| 2010/0186417 | A1 * | 7/2010 | Blomeyer | F23R 3/283 239/398 |
| 2010/0212322 | A1 * | 8/2010 | York | F23D 14/64 60/738 |
| 2015/0135725 | A1 * | 5/2015 | Belous | F02C 6/003 60/791 |
| 2016/0169524 | A1 * | 6/2016 | Widener | F23R 3/34 60/737 |
| 2017/0176012 | A1 * | 6/2017 | Lacy | F02C 3/04 |
| 2017/0204730 | A1 * | 7/2017 | Benson | F01D 5/187 |
| 2019/0085718 | A1 * | 3/2019 | Jang | F01D 9/041 |
| 2021/0017862 | A1 * | 1/2021 | Gustafson | F01D 5/143 |

* cited by examiner

SYSTEM AND METHOD FOR FUEL INJECTION IN TURBINE SECTION OF GAS TURBINE ENGINE

STATEMENT REGARDING FEDERALLY SPONSORED RESEARCH & DEVELOPMENT

This invention was made with Government support under contract number DE-AR0001571 awarded by the Department of Energy. The Government has certain rights in the invention.

BACKGROUND

The subject matter disclosed herein relates to a gas turbine engine having fuel injection in a turbine section.

A gas turbine engine generally includes a compressor section, a combustor section, and a turbine section (e.g., an expansion turbine). The turbine may include one or more turbine stages, each having a plurality of turbine blades. The combustion gas flow expands through the turbine and drives rotation of the turbine blades in each of the one or more turbine stages. In some configurations, the turbine section may include a plurality of fuel injection ports to inject fuel for combustion in the turbine section, thereby adding additional heat in the turbine section to create an isothermal expansion of gases through the one or more turbine stages. Such isothermal expansion can increase gas turbine engine efficiency and performance.

Unfortunately, certain conditions in the turbine section may create vulnerabilities to flame holding near a wall of the turbine section at the plurality of fuel injection ports. Accordingly, a need exists for reducing a possibility of flame holding near the wall of the turbine section.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes at least one component of a turbine section. The at least one component includes an inert gas port formed into a wall of the at least one component. The inert gas port is configured to inject an inert gas into a chamber of the turbine section in a downstream direction. The at least one component also includes a fuel port formed into the wall upstream of the inert gas port. The fuel port is configured to inject a fuel in the downstream direction toward the injected inert gas.

In another embodiment, a system includes a turbine section having circumferentially spaced airfoils, at least one component of the turbine section including an inert gas port formed into a wall of the at least one component. The inert gas port is configured to direct an inert gas in a downstream direction between successive circumferentially spaced airfoils of the turbine section. The at least one component also includes a fuel port formed into the wall upstream of the inert gas port. The fuel port is configured to inject a fuel between the successive circumferentially spaced airfoils in the downstream direction toward the injected inert gas. The inert gas port and the fuel port are disposed between the successive circumferentially spaced airfoils.

In another embodiment, a method includes injecting an inert gas from an inert gas port formed into a wall of at least one component of a turbine section. The method also includes injecting a fuel in a downstream direction toward the injected inert gas from a fuel port formed into the wall. The method also includes causing the injected inert gas to occupy at least a portion of a region downstream of the fuel port and adjacent to the wall.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described in greater detail below, the disclosed embodiments include a fluid injection system in a turbine section of a gas turbine engine, wherein the fluid injection system includes fuel injection ports to inject fuel for combustion in the turbine section, and inert gas injection ports and humps to help reduce the possibility of flame holding near a wall of the turbine section. For example, an inert gas injection port is formed into the wall of the turbine section. Additionally, a fuel injection port is formed into the wall and is disposed upstream of the inert gas injection port. The inert gas injection port is configured to inject inert gas into the turbine section at an acute angle relative to a surface of the wall. Additionally, the fuel injection port is configured to inject fuel into the turbine section at an acute angle relative to the surface of the wall. In certain embodiments, a portion of the fuel injection port and a portion of the inert gas injection port may be formed into a hump protruding from the surface of the wall. An opening of the fuel injection port may be disposed upstream of a crest of the hump, and an opening of the inert gas injection port may be disposed downstream of the crest or, in certain embodiments, partially downstream of the crest. In operation, the hump and a flow of inert gas from the inert gas injection port help to push fuel from the fuel injection port further away from the surface of the wall, thereby helping to push a flame further away from the surface of the wall. In this manner, the hump and the inert gas injection port help to thermally protect the structure of the turbine section from the heat of combustion.

Figure 1:
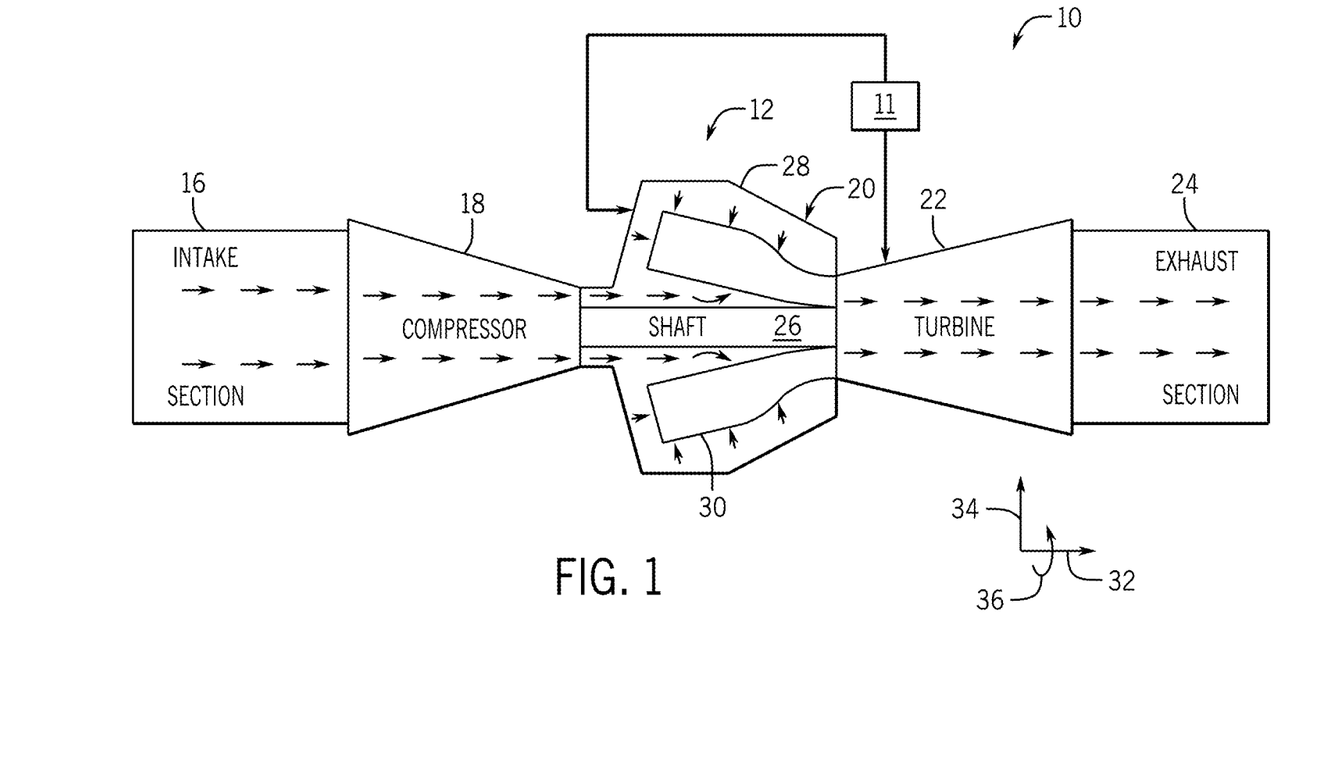
FIG. 1 is a schematic flow diagram of an embodiment of a gas turbine engine having a turbine section with a fuel injection system installed therein, the fuel injection system being configured to mitigate ignition of fuel near a surface of a wall of the turbine section.

With the foregoing in mind, FIG. 1 is a schematic flow diagram of an embodiment of a gas turbine system 10 having a gas turbine engine 12 with a fuel injection system 11. As discussed in detail below, the fuel injection system 11 includes fluid supplies 14 (see FIG. 2) configured to provide fuel and inert gas to the fuel injection system 11. In certain embodiments, the gas turbine system 10 may include an aircraft, a locomotive, a power generation system, or combinations thereof. In serial flow order, the illustrated gas turbine engine 12 includes an air intake section 16, a compressor or compressor section 18, a combustor or combustor section 20, a turbine or turbine section 22 (i.e., an expansion turbine), and an exhaust section 24. The turbine section 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine section 22. The compressed air from the compressor 18 enters the combustor section 20, where the compressed air and fuel mix and combust within combustors to drive the turbine section 22. From the combustor section 20, the hot combustion gases flow through the turbine section 22, driving the compressor 18 via the shaft 26. For example, the combustion gases may apply motive forces to turbine blades within the turbine section 22 to rotate the shaft 26.

In the illustrated embodiment, the fuel injection system 11 is in fluid communication with the combustor section 20 and the turbine section 22. In the illustrated embodiment, the fuel injection system 11 may include one or more combined or separate fuel injection systems configured to inject fuel into the combustor section 20 and the turbine section 22. For example, as illustrated in FIG. 1, the fuel injection system 11 injects fuel into the turbine section 22 to provide additional heat in the turbine section 22, while also injecting inert gas and using surface protrusions ("humps") to reduce the possibility of flame holding along surfaces in the turbine section 22. After flowing through the turbine section 22, the hot combustion gases may exit the gas turbine engine 12 through the exhaust section 24. The gas turbine engine 12 may be described in terms of a longitudinal direction or axis 32 (e.g., axial direction), a radial direction or axis 34, and a circumferential direction or axis 36.

Figure 2:
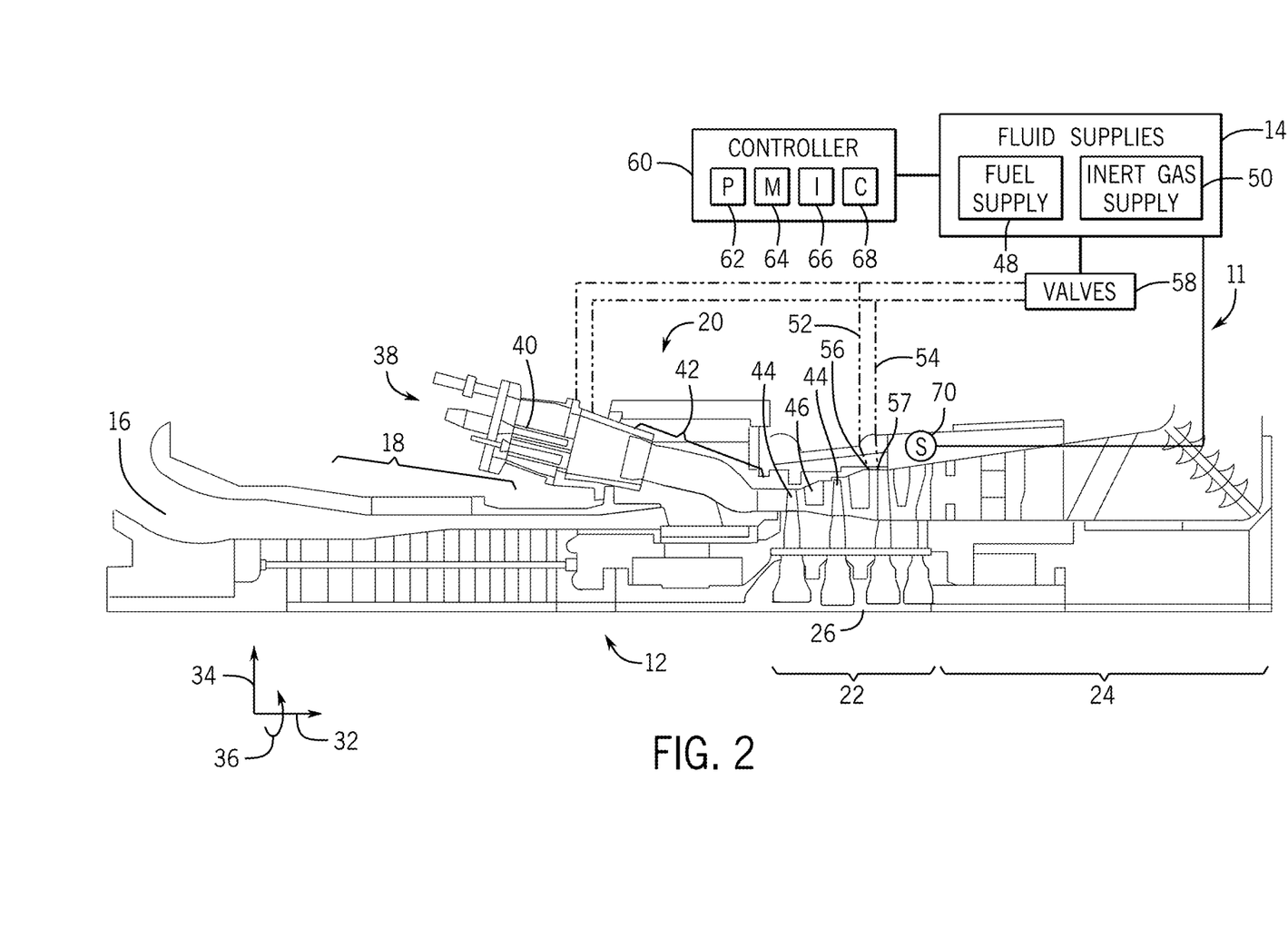
FIG. 2 is a cross-sectional side view of an embodiment of the gas turbine engine of FIG. 1 sectioned through the longitudinal axis.

FIG. 2 is a cross-sectional side view of an embodiment of the gas turbine engine 12 of FIG. 1 sectioned through the longitudinal axis 32, illustrating an embodiment of the fuel injection system 11 (e.g., separate or integrated fuel injection systems) coupled to the combustor section 20 and the turbine section 22. As described above with respect to FIG. 1, air may enter the gas turbine engine 12 through the air intake section 16 and may be compressed by the compressor 18. The compressed air from the compressor 18 may then be directed into the combustor section 20 where the compressed air may be mixed with fuel from the fuel injection system 11. The combustor section 20 includes one or more combustors 38. In certain embodiments, the gas turbine engine 12 may include multiple combustors 38 disposed in an annular arrangement (e.g., in a so-called can-annular combustor arrangement). Further, each combustor 38 may include multiple fuel nozzles 40 attached to or near a head end of each combustor 38 in an annular or other arrangement. In operation, the fuel nozzles 40 may inject a fuel-air mixture into the combustors 38 in a suitable ratio for optimal combustion, emissions, fuel consumption, and power output. Within the combustor section 20, the fuel-air mixture may combust to generate hot, pressurized combustion gases. After combustion, the hot pressurized combustion gases may flow through a transition piece 42 and exit the combustor section 20 to the turbine section 22. Within the turbine section 22, the pressurized combustion gases may turn blades 44 (e.g., rotating turbine blades) that extend radially within the turbine section 22 and that are disposed between vanes 46 (e.g., stationary turbine vanes) to rotate the shaft 26 before exiting through the exhaust section 24 as exhaust gas.

In certain embodiments, the turbine section 22 may include one or more turbine stages (e.g., 1, 2, 3, 4, or more) disposed at different axial positions along the longitudinal axis 32 of the turbine section 22. Each turbine stage has a plurality of blades 44 (e.g., rotary turbine blades) spaced apart from one another in a circumferential arrangement (e.g., circumferentially spaced) about the longitudinal axis 32 of the turbine section 22 at a common axial position, wherein the blades 44 are coupled to a central turbine rotor or shaft of the turbine section 22. Similarly, each turbine stage has a plurality of vanes 46 (e.g., stationary turbine vanes) spaced apart from one another in a circumferential arrangement (e.g., circumferentially spaced) about the longitudinal axis 32 of the turbine section 22 at a common axial position offset from the blades 44, wherein the vanes 46 are coupled to an outer casing or wall of the turbine section 22. In certain embodiments, each of the blades 44 and the vanes 46 may include an airfoil shaped structure oriented or extending in a radial direction (e.g., radial airfoil).

In the illustrated embodiment, the fuel injection system 11 includes the fluid supplies 14 having a fuel supply 48 and an inert gas supply 50. As shown, the fluid supplies 14 (e.g., fuel supply 48 and inert gas supply 50) are fluidly coupled to the combustor section 20 and the turbine section 22 of the gas turbine engine 22. However, in some embodiments, separate fuel injection systems 11 may be coupled to the combustor section 20 and the turbine section 22. The fuel supply 48 may be configured to store and supply one or more fuels 52, such as natural gas, syngas, methane [$CH_4$], hydrogen [$H_2$], ammonia [$NH_3$], biofuels, or combinations thereof. The inert gas supply 50 may be configured to store and supply one or more inert gases, such as nitrogen [$N_2$], argon [Ar], carbon dioxide [$CO_2$], recirculated exhaust gas (e.g., from an exhaust gas recirculation [EGR] system and containing carbon dioxide), or combinations thereof.

The fuel injection system 11 may be configured to supply the same or different fuels 52 (e.g., natural gas, syngas, methane [$CH_4$], hydrogen [$H_2$], ammonia [$NH_3$], biofuels, or combinations thereof) to the combustor section 20 and the turbine section 22. For example, the fuel injection system 11 may be configured to use relatively low carbon fuels or carbon free fuels (e.g., hydrogen, ammonia, biofuel, or combinations thereof) for both the combustor section 20 and the turbine section 22, or the fuel injection system 11 may be configured to use carbon-containing fuels (e.g., natural gas, syngas, methane, or combinations thereof) for the combustor section 20 and relatively low carbon fuels or carbon free fuels (e.g., hydrogen, ammonia, biofuel, or combinations thereof) for the turbine section 22. In certain embodiments, the fuel injection system 11 may be configured to use different fuels at different operational stages of the gas turbine system 10, such as start-up, steady state, shut-down, part-load conditions, or transient conditions.

The fuel supply 48 is configured to supply a fuel 52 (e.g., natural gas, syngas, methane, hydrogen, ammonia, biofuels, or combinations thereof) to the turbine section 22, and the inert gas supply 50 is configured to supply an inert gas 54 (e.g., carbon dioxide, nitrogen, argon, recirculated exhaust gas, or combinations thereof) to the turbine section 22. As discussed in further detail herein, the fuel 52 is injected into the turbine section 22 via a plurality of fuel injection ports 56 (e.g., fuel ports), and the inert gas 54 is injected into the turbine section 22 via a plurality of inert gas injection ports 57 (e.g., inert gas ports). The fuel injection ports 56 and the inert gas injection ports 57 are disposed directly on and/or between airfoils (e.g., blades 44 and/or vanes 46) in one or more turbine stages of the turbine section 22. The fuel injection ports 56 and the inert gas injection ports 57 may extend from channels formed in the structure of the turbine section 22, wherein the channels may be cylindrical, rectangular, or other shapes. Similarly, depending on the interface of the channels with the surfaces of the turbine section 22, the fuel injection ports 56 and the inert gas injection ports 57 may be circular, rectangular, oval, triangular, polygonal, or other (not necessarily symmetrical) shapes.

In the illustrated embodiment, the fuel injection system 11 includes a plurality of valves 58 that regulates a flowrate of the fuel 52 and/or the inert gas 54 from the fluid supplies 14 to the fuel injection ports 56 and/or the inert gas injection ports 57. As shown, the fuel injection system 11 additionally includes a controller 60 having a processor 62, a memory 64, and communication circuitry 68 coupled to various sensors and actuators of the gas turbine system 10. The processor 62 includes instructions 66 stored in the memory 64 and executable by the processor 62 to control the gas turbine system 10 and particularly the fuel injection system 11. The controller 60 is communicatively coupled (e.g., via the communication circuitry 68) to the fluid supplies 14, the plurality of valves 58 and, in certain embodiments, a sensor 70 disposed in the turbine section 22. In certain embodiments, the sensor 70 may provide a signal indicative of a flow rate of the fuel 52 and/or the inert gas 54. The controller 60 may be configured to determine an estimated flow rate of fuel 52 and/or the inert gas 54 based on the received signal and control the plurality of valves 58 to control a flowrate of the fuel 52 and/or the inert gas 54 based on the estimated flow rate.

Figure 3:
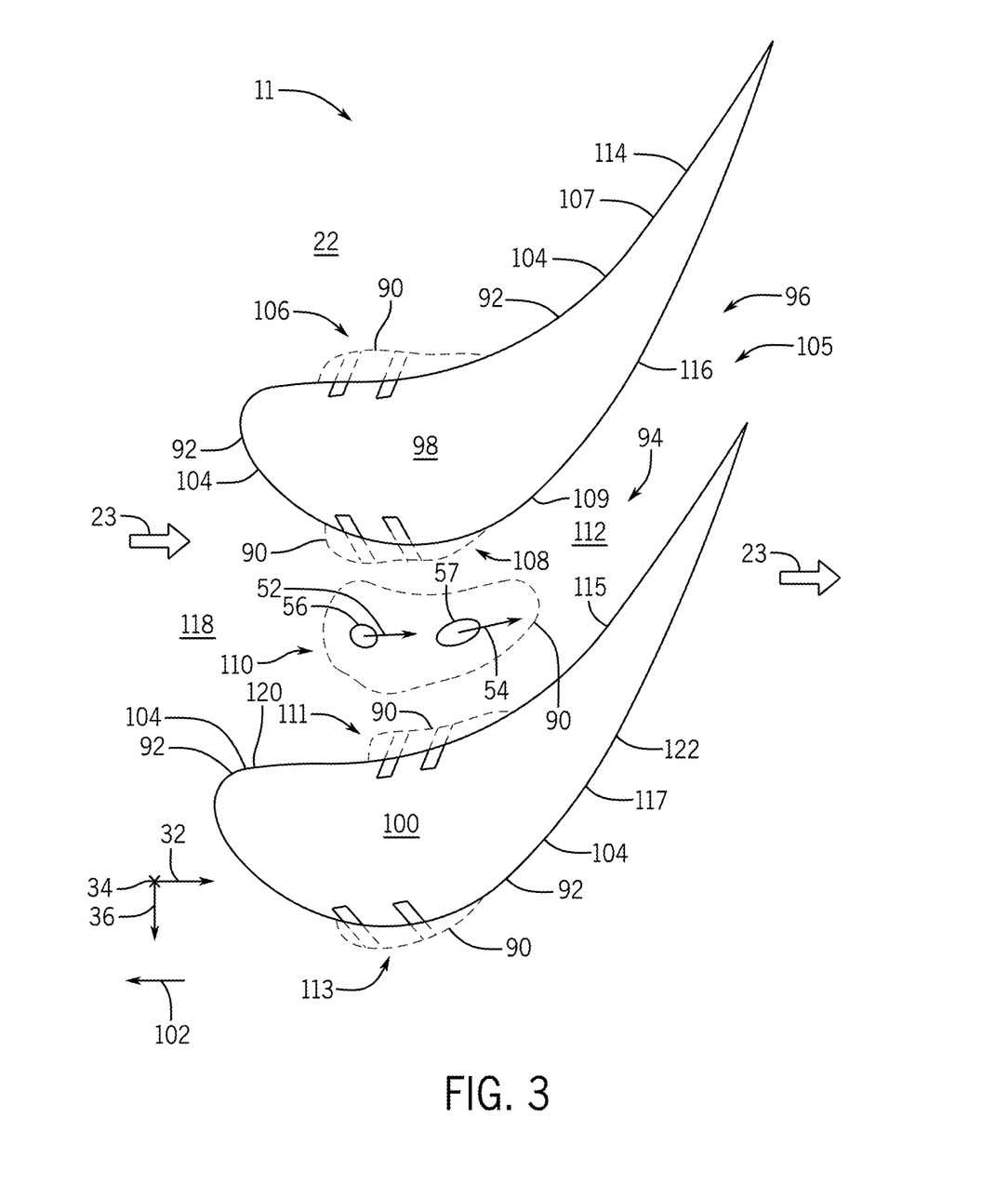
FIG. 3 is a top view of an embodiment of the turbine section of the gas turbine engine of FIG. 2, further illustrating the fuel injection system having a fuel injection port and an inert gas injection port formed into a hump protruding from a wall of the turbine section.

FIG. 3 is a top view of an embodiment of the turbine section 22 of the gas turbine engine 12 of FIG. 2, further illustrating the fuel injection system 11 having one or more fuel injection ports 56 and one or more inert gas injection port 57 formed into one or more humps 90 protruding from one or more walls 92 of the turbine section 22 along a flow path 23 (e.g., hot combustion gas flow) through the turbine section 22. As shown, the fuel injection ports 56 are configured to direct (e.g., inject) the fuel 52 (e.g., jet, stream, or spray of fuel) into a chamber 94 between successive circumferentially spaced airfoils 96 (e.g., airfoil 98, airfoil 100) of the turbine section 22, and the inert gas injection ports 57 are configured to direct the inert gas 54 (e.g., film of inert gas, jet of inert gas) into the chamber 94. In certain embodiments, the airfoils 96 may include turbine blades 44, turbine vanes 46, or a combination thereof. As shown, the fuel injection ports 56 are disposed upstream (e.g., in an upstream direction 102 opposite the flow path 23) relative to the inert gas injection ports 57. As discussed in further detail herein, the inert gas injection ports 57 are configured to direct the inert gas 54 downstream of and below the injected fuel 52 to mitigate ignition (e.g., flame anchoring) of the injected fuel 52 near one or more surfaces 104 of the one or more walls 92. In certain embodiments, the one or more humps 90 may be manufactured via bending (e.g., shaping) the one or more surfaces 104, additive manufacturing on the one or more surfaces 104, or other manufacturing techniques.

In the illustrated embodiment, the turbine section includes sets of ports 105 (e.g., first set 106, second set 108, third set 110, fourth set 111, fifth set 113) formed into one or more walls 92 (e.g., first wall 107, second wall 109, third wall 112, fourth wall 115, fifth wall 117) of the turbine section 22. As shown, each set of ports 105 includes an inert gas injection port 57 and a fuel injection port 56 disposed in the upstream direction 102 relative to the inert gas injection port 57. In certain embodiments, a pressure ratio of the fuel 52 injected by the fuel injection port 56 ranges from 1.5 to 1.7, from 1.55 to 1.65, from 1.575 to 1.625, or a combination thereof. In certain embodiments, a pressure ratio of the inert gas 54 injected by the inert gas injection port 57 ranges from 1.0 to 1.2, from 1.05 to 1.15, from 1.075 to 1.125, or a combination thereof.

In the illustrated embodiment, the turbine section 22 includes the first set 106 formed into the wall 107 of the airfoil 98, the second set 108 formed into the wall 109 of the airfoil 98, and the third set 110 formed into the wall 112 between the successive circumferentially spaced airfoils 98, 100. In certain embodiments, the wall 107 may be the pressure side wall of the airfoil 96, 98 and the wall 109 may be the suction side wall of the airfoil 96, 98. In certain embodiments, the wall 112 may include an outer diameter wall of the turbine section (e.g., when the airfoils 96 are vanes 46). Additionally, or alternatively, the wall 112 may include an inner diameter wall of the turbine section 22 (e.g., when the airfoils 96 are blades 44). In certain embodiments, the turbine section 22 may include any combination of the sets of ports 105. Although the illustrated embodiment shows the turbine section as including three sets of ports 105 (two sets per airfoil 96 and one set between adjacent airfoils 98, 100), it may be recognized that the turbine section 22 may include more or fewer sets of ports 105 per airfoil 96 and/or pairs of adjacent airfoils (e.g., 98, 100). For example, the turbine section 22 may include 1, 2, 4, 5, 6, or more sets of ports 105 per airfoil 96 and/or pair of adjacent airfoils (e.g., 98, 100).

As shown, the one or more fuel injection ports 56 and the one or more inert gas injection ports 57 are formed into the one or more humps 90 protruding from the one or more surfaces 104 (e.g., first surface 114 of airfoil pressure side wall 107, second surface 116 of airfoil suction side wall 109, third surface 118 of wall 112 between airfoils 96, fourth surface 120 of airfoil pressure side wall 115, and fifth surface 122 of airfoil suction side wall 117). In certain embodiments, the one or more fuel injection ports 56 may be formed into a surface 104 upstream of a hump 90, while the one or more inert gas injection ports 57 are formed into the hump 90.

As indicated by the dotted lines in FIG. 3, one or more of the humps 90, along with respective portions of a fuel injection port and an inert gas injection port formed into the one or more humps 90, may be omitted. That is, in certain embodiments, the one or more fuel injection ports 56 and the one or more inert gas injection ports 57 may be directly formed into the one or more surfaces 104 when the one or more humps 90 are omitted. The omission of the one or more humps 90 and/or the one or more surfaces 104 from which the one or more humps 90 may protrude additionally applies to the embodiments shown in FIGS. 4-7. Furthermore, in some embodiments, the fuel injection ports 56, the inert gas injection ports 57, and/or the humps 90 may be formed only on the airfoils 96 (e.g., pressure side and/or suction side), only on the wall 112 between the circumferentially spaced airfoils 96, or a combination thereof.

Figure 4:
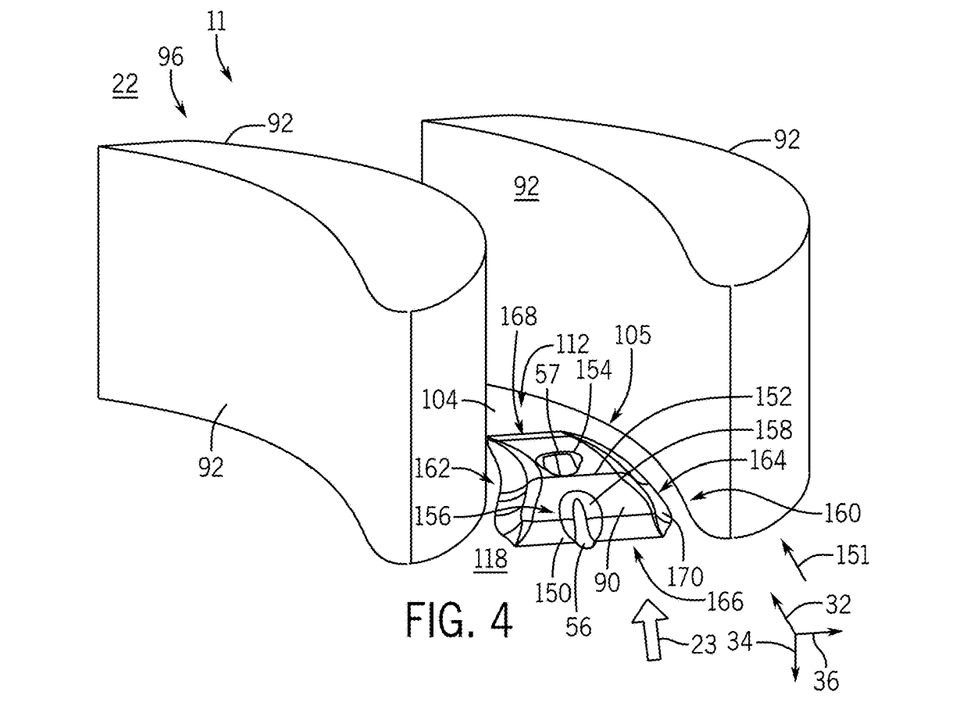
FIG. 4 is a perspective view of an embodiment of the fuel injection system of FIG. 2, further illustrating the fuel injection port and the inert gas injection port formed into a hump disposed between successive circumferentially spaced airfoils of the turbine section.

FIG. 4 is a perspective view of an embodiment of the fuel injection system 11 of FIG. 2, further illustrating the fuel injection port 56 and the inert gas injection port 57 formed into the hump 90 disposed in the wall 112 between the successive circumferentially spaced airfoils 96 of the turbine section 22. In the illustrated embodiment, a fuel injection port opening 150 of the fuel injection port 56 is disposed upstream of a crest 152 (e.g., peak) of the hump 90. Additionally, an inert gas injection port opening 154 of the inert gas injection port 57 is disposed downstream of the crest 152. As shown, the fuel injection port opening 150 is at least partially formed into an upstream portion 156 of the hump 90. In certain embodiments, the fuel injection port opening 150 may be formed into a surface 104 upstream of the hump 90. As shown, the edges 158 formed by the fuel injection port opening 150 and the inert gas injection port opening 154 with the hump 90 are rounded edges. In certain embodiments, the edges 158 formed by the fuel injection port opening 150 and/or the inert gas injection port opening 154 with the hump 90 may be sharp edges, fillet edges, or a combination thereof.

As shown, the hump 90 includes lateral sides 160 (e.g., first lateral side 162, second lateral side 164), an upstream side 166, and a downstream side 168. The hump 90 gradually increases in height from the sides 160, 166, and 168 to the crest 152 via one or more tapered surfaces, curved surfaces, or a combination thereof. For example, relative to the flow path 23, the hump 90 gradually increases in height via one or more tapered and/or curved surfaces from the upstream side 166 to the crest 152, and the hump 90 gradually decreases in height via one or more tapered and/or curved surfaces from the crest 152 to the downstream side 168. As discussed herein, the lateral sides 160 of the hump 90 are curved along the downstream direction 151 based on a curvature of the successive circumferentially spaced airfoils 96. In other words, the curvature of the lateral sides 160 generally tracks or follows (e.g., substantially matches) the curvature of the airfoils 96. For example, each of the lateral sides 160 may generally curve or turn in a common direction between opposite faces of the adjacent airfoils 96. Additionally, as shown, the lateral sides 160, the upstream side 166, and the downstream side 168 include smooth transitions 170 (e.g., edges, boundaries) between the hump 90 and the surface 104.

In the illustrated embodiment, the hump 90 is shown as protruding (e.g., radially protruding) from the surface 118 of the wall 112 disposed between the successive circumferentially spaced airfoils 96. Additionally or alternatively, one or more humps 90 may protrude from any combination of the surfaces 104 of any combination of the walls 92. That is, the turbine section 22 may include one or more humps 90, with each hump 90 having a set of ports 105 formed into the hump 90. In certain embodiments, the hump 90 gradually increases in height from the fuel injection port 56 toward the crest 152, thereby helping to push a combustible mixture (e.g., the combustion gas along the flow path 23 and the fuel from the fuel injection port 56) further away from the surface 104 (e.g., 118) of the wall 92 (e.g., 112) to help block flame holding near the surface 104 (e.g., 118) of the wall 92 (e.g., 112). Additionally, the inert gas from the inert gas injection port 57 fills and pressurizes a region downstream of the crest 152 of the hump 90 to help block flame holding near the surface 104 (e.g., 118) of the wall 92 (e.g., 112).

As indicated by the dotted lines in FIG. 3, the hump 90 may be omitted. That is, in certain embodiments, the fuel injection port 56 and the inert gas injection port 57 may be directly formed into the surface 104 when the hump 90 is omitted. In such embodiments, the inert gas from the inert gas injection port 57 fills and pressurizes a region of the surface 104 downstream of the fuel injection port 56, thereby pushing the fuel away from the surface 104 (e.g., 118) of the wall 92 (e.g., 112).

Figure 5:
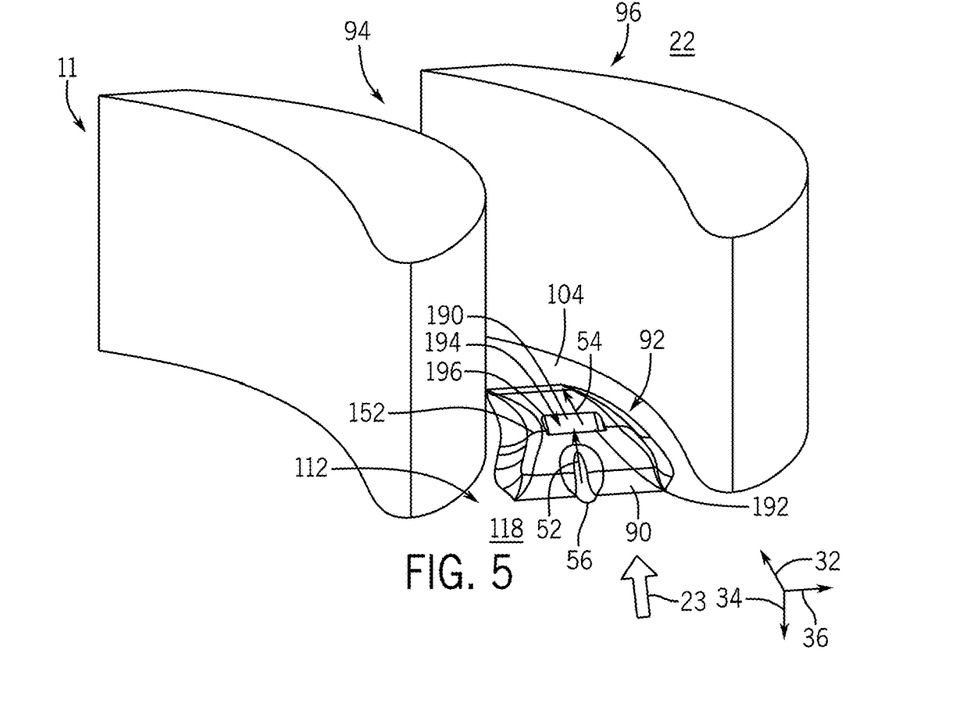
FIG. 5 is a perspective view of an embodiment of the fuel injection system of FIG. 2, further illustrating the fuel injection port and an inert gas injection slot formed into the hump disposed between successive circumferentially spaced airfoils of the turbine section.

FIG. 5 is a perspective view of an embodiment of the fuel injection system 11, further illustrating the fuel injection port 56 and an inert gas injection slot 190 (e.g., inert gas injection slotted port, inert gas slot, slot) formed into the hump 90 disposed between successive circumferentially spaced airfoils 96 of the turbine section 22. For substantially the same reasons as discussed above with reference to FIG. 4, the hump 90 and the inert gas injection port 57 help to block flame holding near the surface 104 (e.g., 118) of the wall 92 (e.g., 112). As shown, the inert gas injection slot 190 is formed into the hump 90 and disposed downstream of the fuel injection port 56. In the illustrated embodiment, an upstream slot portion 192 of the inert gas injection slot 190 is disposed upstream of the crest 152 of the hump 90, and a downstream slot portion 194 of the inert gas injection slot 190 is disposed downstream of the crest 152. In certain embodiments, the entirety of the inert gas injection slot 190 is disposed downstream of the crest 152. As shown, a slot opening 196 of the inert gas injection slot 190 is rectangular in shape. In certain embodiments, the slot opening 196 may have another shape (e.g., a triangle, an ellipse, a trapezoid).

It may be appreciated that the inert gas injection slot 190 may be configured to inject a layer (e.g., film) of inert gas 54 into the chamber 94. In certain embodiments, an injected layer of inert gas 54 may have a shorter spread (e.g., vertical spread) relative to the hump 90 and/or may remain closer to the hump 90 and/or the surface 104 downstream of the hump 90. Additionally, as discussed further herein, an angle spanning from central axis of the inert gas injection slot 190 to the surface 104 of the wall 92 may be lower than a corresponding angle spanning from a central axis of an inert gas injection port 57 to the surface 104. In certain embodiments, a pressure ratio of the fuel 52 injected by the fuel injection port 56 ranges from 1.5 to 1.7, from 1.55 to 1.65, from 1.575 to 1.625, or a combination thereof. In certain embodiments, a pressure ratio of the inert gas 54 injected by the inert gas injection slot 190 ranges from 1.0 to 1.2, from 1.05 to 1.15, from 1.075 to 1.125, or a combination thereof.

Figure 6:
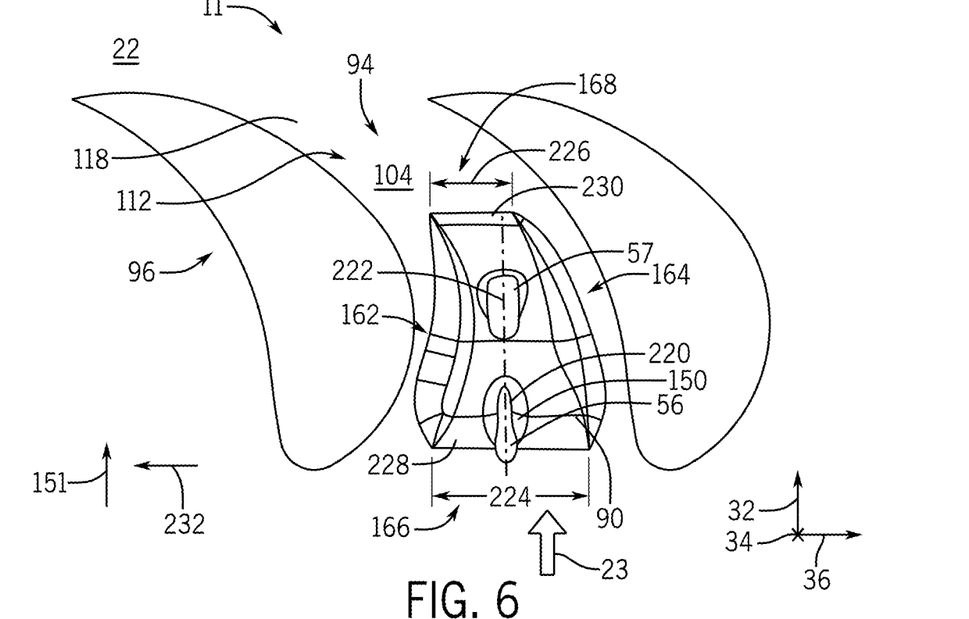
FIG. 6 is a top view of an embodiment of the fuel injection system of FIGS. 2 and 4, further illustrating the fuel injection port and the inert gas injection port formed into the hump disposed between successive circumferentially spaced airfoils of the turbine section.

FIG. 6 is a top view of an embodiment of the fuel injection system 11 of FIG. 4, further illustrating the fuel injection port 56 and the inert gas injection port 57 formed into the hump 90 disposed between successive circumferentially spaced airfoils 96 of the turbine section 22. For substantially the same reasons as discussed above with reference to FIG. 4, the hump 90 and the inert gas injection port 57 help to block flame holding near the surface 104 (e.g., 118) of the wall 92 (e.g., 112). As shown, the hump 90 is disposed in the chamber 94 between the successive circumferentially spaced airfoils 96. In the illustrated embodiment, the fuel injection port opening 150 of the fuel injection port 56 is partially formed into the hump 90 and partially formed into the surface 104. In certain embodiments, the fuel injection port opening 150 may be formed into the hump 90 or the surface 104.

In the illustrated embodiment, a fuel injection port central axis 220 of the fuel injection port 56 is aligned with an inert gas injection port central axis 222 of the inert gas injection port 57 in the axial direction 32, as well as in the downstream direction 151 along the flow path 23. In certain embodiments, the fuel injection port central axis 220 may be aligned with the inert gas injection port central axis 222 in the axial direction 32 or the downstream direction 151 of the flow path 23. In some embodiments, the fuel injection port central axis 220 may be offset from (e.g., not aligned with) the inert gas injection port central axis 222.

In the illustrated embodiment, an upstream width dimension 224 of the upstream side 166 of the hump 90 is larger than a downstream width dimension 226 of the downstream side 168 of the hump 90. In certain embodiments, the upstream width dimension 224 may be equal to or smaller than the downstream width dimension 226. In the illustrated embodiment, an upstream transition 228 (e.g., upstream edge, upstream boundary) of the upstream side 166 of the hump 90 is substantially parallel to a downstream transition 230 of the hump 90.

As shown, the first lateral side 162 and the second lateral side 164 of the hump 90 have curvatures that follows a curvature of the airfoils 96. That is, a first sign of a first curvature of the first lateral side 162 matches a sign of the curvature of the airfoils 96, and a second sign of a second curvature of the second lateral side 164 matches a sign of the curvature of the airfoils 96. In the illustrated embodiment, the airfoils 96, the first lateral side 162, and the second lateral side 164 each curve in the circumferential direction 232. In certain embodiments, the airfoils 96, the first lateral side 162, and the second lateral side 164 may each curve in the circumferential direction 36.

Figure 7:
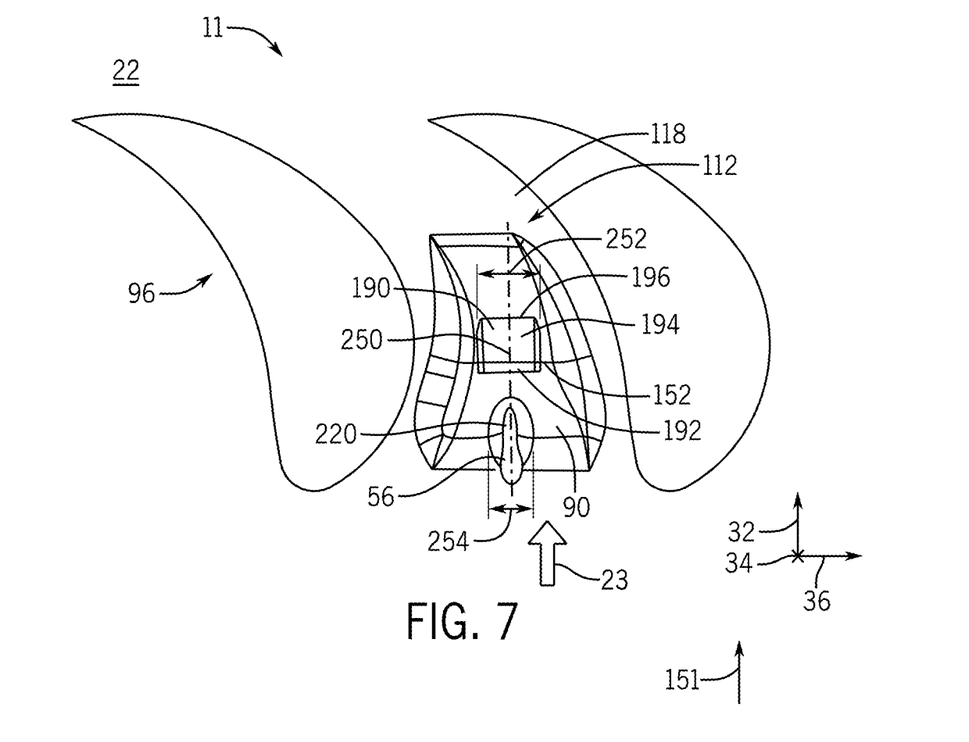
FIG. 7 is a top view of an embodiment of the fuel injection system of FIGS. 2 and 5, further illustrating the fuel injection port and the inert gas injection slot formed into the hump disposed between successive circumferentially spaced airfoils of the turbine section.

FIG. 7 is a top view of an embodiment of the fuel injection system 11 of FIG. 5, further illustrating the fuel injection port 56 and the inert gas injection slot 190 formed into the hump 90 disposed between successive circumferentially spaced airfoils 96 of the turbine section 22. For substantially the same reasons as discussed above with reference to FIG. 4, the hump 90 and the inert gas injection port 57 help to block flame holding near the surface 104 (e.g., 118) of the wall 92 (e.g., 112). As shown, the inert gas injection slot 190 is formed into the hump 90 and disposed downstream of the fuel injection port 56. In the illustrated embodiment, the upstream slot portion 192 of the inert gas injection slot 190 is disposed upstream of the crest 152 of the hump 90, and the downstream slot portion 194 of the inert gas injection slot 190 is disposed downstream of the crest 152. In certain embodiments, the entirety of the inert gas injection slot 190 is disposed downstream of the crest 152. As shown, the slot opening 196 of the inert gas injection slot 190 is rectangular in shape. In certain embodiments, the slot opening 196 may have another shape (e.g., a triangle, an ellipse, a trapezoid).

In the illustrated embodiment, the fuel injection port central axis 220 of the fuel injection port 56 is aligned with an inert gas injection slot central axis 250 of the inert gas injection slot 190 in the axial direction 32, as well as in the downstream direction 151 of the flow path 23. In certain embodiments, the fuel injection port central axis 220 may be aligned with the inert gas injection slot central axis 250 in the axial direction 32 or the downstream direction 151 of the flow path 23. In some embodiments, the fuel injection port central axis 220 may be offset from (e.g., not aligned with) the inert gas injection slot central axis 250.

In the illustrated embodiment, a slot width dimension 252 of the slot opening 196 is larger than a fuel injection port width dimension 254 of the fuel injection port 56. In certain other embodiments, the slot width dimension 252 may be substantially equivalent to the fuel injection port width dimension 254 or smaller than the fuel injection port width dimension 254.

Figure 8:
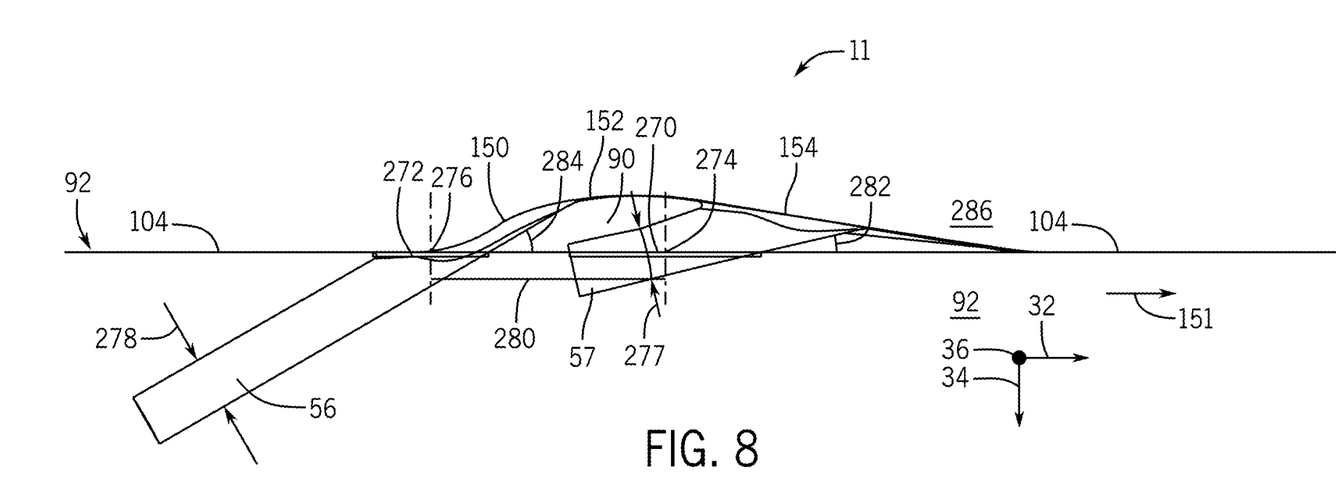
FIG. 8 is a side cross-sectional view of an embodiment of the fuel injection system of FIG. 2, further illustrating the fuel injection port and the inert gas injection port formed into the hump.

FIG. 8 is a side cross-sectional view of an embodiment of the fuel injection system 11 of FIG. 6, further illustrating the fuel injection port 56 and the inert gas injection port 57 formed into the hump 90. For substantially the same reasons as discussed above with reference to FIG. 4, the hump 90 and the inert gas injection port 57 help to block flame holding near the surface 104 (e.g., 118) of the wall 92 (e.g., 112). In the illustrated embodiment, the fuel injection port 56 is formed into the wall 92 and into the hump 90, such that the fuel injection port opening 150 of the fuel injection port 56 is formed into the hump 90 upstream of the crest 152 of the hump 90. Additionally, the inert gas injection port 57 is formed into the wall 92 and into the hump 90, such that the inert gas injection port opening 154 of the inert gas injection port 57 is formed into the hump 90 downstream of the crest 152.

In the illustrated embodiment, a first intersection of the inert gas injection port 57 and the surface 104 of the wall 92 forms a first cross-section 270. Additionally, a second intersection of the fuel injection port 56 and the surface 104 forms a second cross-section 272. As shown, the first cross-section 270 includes a first centroid 274, and the second cross-section 272 includes a second centroid 276. Additionally, as shown, the inert gas injection port has a first hydraulic diameter 277, and the fuel injection port 56 has a second hydraulic diameter 278. In certain embodiments, the first hydraulic diameter 277 and the second hydraulic diameter 278 are substantially equivalent or equal. In certain embodiments, a distance 280 spanning from the first centroid 274 to the second centroid 276 ranges from twice the second hydraulic diameter 278 to one hundred times the second hydraulic diameter 278.

In the illustrated embodiment, the inert gas injection port central axis 222 forms a first angle 282 with the surface 104, and the fuel injection port central axis 220 forms a second angle 284 with the surface 104. In the illustrated embodiment, the first angle 282 is between 0 and 10 degrees, and the second angle 284 is between 15 and 25 degrees. In certain embodiments, when the hump 90 is omitted, the first angle 282 is between 15 and 25 degrees, and the second angle 284 is between 15 and 25 degrees. In certain embodiments, the first angle 282 is substantially equivalent or equal to the second angle 284. In certain embodiments, the first angle 282 is less than the second angle 284 by an angular difference of at least 1, 2, 3, 4, 5, 6, 7, 8, 9, 10, or more degrees. In some embodiments, the second angle 284 substantially matches an incline angle along the hump 90 between the fuel injection port 56 and the crest 152. In some embodiments, the first angle 282 is a fraction of the second angle 284, such as approximately 25 to 85 percent, 30 to 70 percent, 40 to 60 percent, or 50 percent of the second angle 284.

As shown, the injected inert gas 54 is caused to occupy (e.g., flow through) at least a portion of a region 286 downstream of the fuel injection port 56. It may be appreciated that the presence of the inert gas 54 in the region 286 may mitigate an ignition (e.g., flame anchoring) of the fuel 52 near the surface 104 of the wall 92 downstream of the fuel injection port 56. In other words, without the inert gas 54 in the region 286, the region 286 may be considered a low-pressure zone that could be susceptible to flame holding. Thus, the inert gas 54 injected by the inert gas injection port 57 helps to fill and pressurize the region 286 to make the region 286 non-combustible, thereby thermally shielding the surface 104 of the wall 92.

Figure 9:
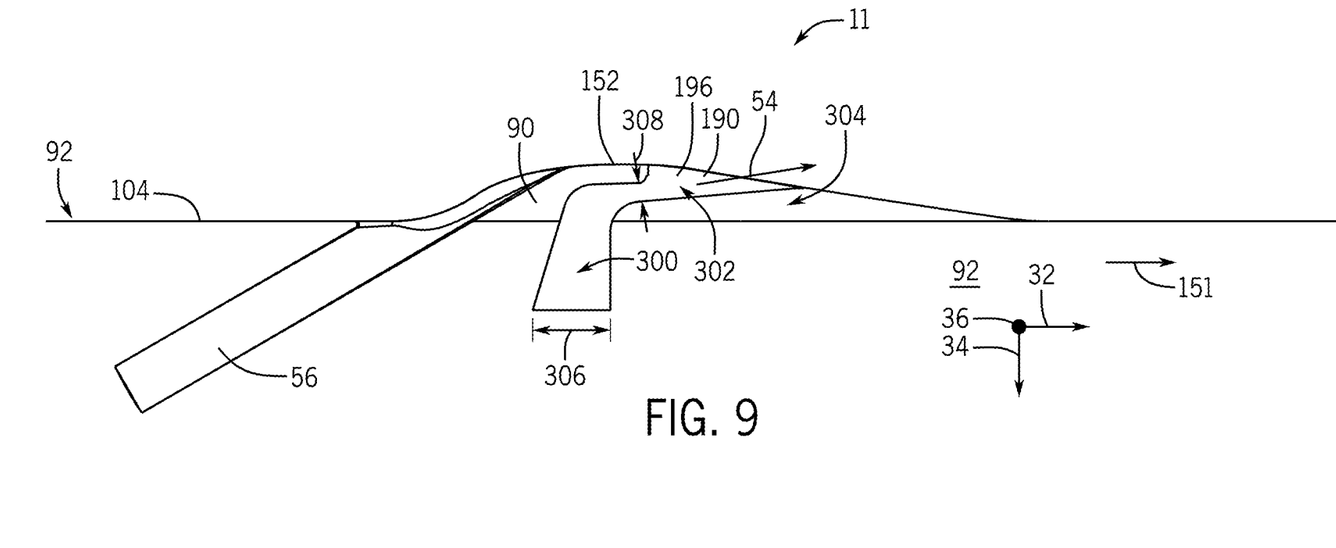
FIG. 9 is a side cross-sectional view of an embodiment of the fuel injection system of FIG. 2, further illustrating the fuel injection port and the inert gas injection slot formed into the hump.

FIG. 9 is a side cross-sectional view of an embodiment of the fuel injection system 11 of FIG. 7, further illustrating the fuel injection port 56 and the inert gas injection slot 190 formed into the hump 90. For substantially the same reasons as discussed above with reference to FIG. 4, the hump 90 and the inert gas injection port 57 help to block flame holding near the surface 104 (e.g., 118) of the wall 92 (e.g., 112). In the illustrated embodiment, the fuel injection port 56 is formed into the wall 92 and into the hump 90, such that the fuel injection port opening 150 of the fuel injection port 56 is formed into the hump 90 upstream of the crest 152 of the hump 90. Additionally, the inert gas injection slot 190 is formed into the wall 92 and into the hump 90, such that the slot opening 196 of the inert gas injection slot 190 is formed into the hump 90 downstream of the crest 152. In certain embodiments, an upstream portion of the slot opening 196 is disposed upstream of the crest 152, and a downstream portion of the slot opening 196 is disposed downstream of the crest 152.

In the illustrated embodiment, the inert gas injection slot 190 includes a vertical slot portion 300 and a horizontal slot portion 302 (e.g., downstream portion). As shown, the vertical slot portion 300 extends crosswise to the surface 104 into an interior 304 of the hump 90. As shown, a vertical slot portion width dimension 306 of the vertical slot portion 300 decreases in the radial direction 34, such that the vertical slot portion 300 becomes narrower near the crest 152 of the hump 90. The horizontal slot portion 302 extends substantially crosswise to the vertical slot portion 300 in the downstream direction 151, and is fluidly coupled to the vertical slot portion 300 and the slot opening 196. As shown, a horizontal slot portion width dimension 308 of the horizontal slot portion 302 is narrower than the vertical slot portion width dimension 306 and, in certain embodiments, may compress the inert gas 54 as it flows through the slot opening 196.

Figure 10:
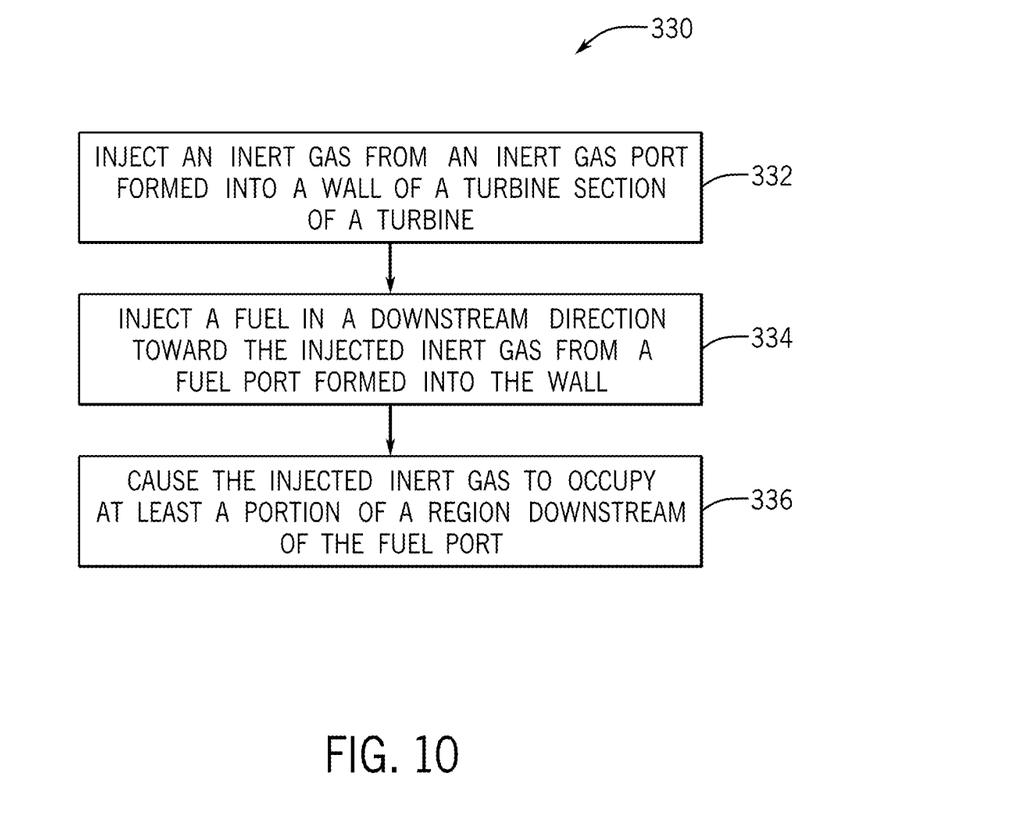
FIG. 10 is a flowchart showing an example process of operating the fuel injection system of FIG. 2.

FIG. 10 is a flowchart showing an example process 330 for operating and controlling the fuel injection system 11 of FIGS. 1-9. The process 330 may be performed by the controller 60 of FIG. 2 or any other suitable computing device(s) or controller(s). Furthermore, the actions of the process 330 may be performed in the order disclosed herein or in any other suitable order. For example, certain actions of the process 330 may be performed concurrently. In addition, in certain embodiments, at least one of the actions of the process 330 may be omitted.

In block 332 of the process 330, an inert gas is injected from an inert gas injection port formed into a wall of a turbine section of a turbine. In certain embodiments, the inert gas may be injected between successive circumferentially spaced airfoils, which may include turbine vanes, turbine blades, or a combination thereof. Additionally, or alternatively, the wall may include a wall of a turbine vane, a wall of a turbine blade, an inner diameter wall of the turbine section, an outer diameter wall of the turbine section, or a combination thereof. In certain embodiments, the injected inert gas may include an injected layer (e.g., film) of inert gas injected from an inert gas injection slot. In certain embodiments, the inert gas may include carbon dioxide (including recirculated exhaust gases comprising carbon dioxide), nitrogen, argon, or a combination thereof.

In certain embodiments, a portion of the inert gas injection port is formed into a hump protruding from the surface of the wall. In certain embodiments, an opening of the inert gas injection port is disposed downstream of a crest of the hump. The inert gas may be injected at an acute angle relative to the surface of the wall. In certain embodiments, when the hump is omitted, the acute angle is between 15 and 25 degrees. In certain embodiments, when the hump is included, the acute angle is between 0 and 10 degrees.

In block 334 of the process 330, a fuel is injected in a downstream direction toward the injected inert gas. The fuel is injected from a fuel injection port formed into the wall of the turbine section. In certain embodiments, the fuel may be injected between successive circumferentially spaced airfoils, which may include turbine vanes, turbine blades, or a combination thereof. Additionally, or alternatively, the wall may include a wall of a turbine vane, a wall of a turbine blade, an inner diameter wall of the turbine section, an outer diameter wall of the turbine section, or a combination thereof. The fuel may be injected at an acute angle relative to the surface of the wall. In certain embodiments, the acute angle may range from 15 to 25 degrees. In certain embodiments, a portion of the fuel injection port is formed into a hump protruding from the surface of the wall. In certain embodiments, an opening of the fuel injection port is disposed upstream of a crest of the hump. In certain embodiments, the fuel may include $CH_4$, $H_2$, or a combination thereof.

In block 336 of the process 330, the injected inert gas is caused to occupy (e.g., flow through) at least a portion of a region downstream of the fuel injection port. It may be appreciated that the presence of the inert gas in the region may mitigate an ignition (e.g., flame anchoring) of the fuel near the surface of the wall downstream of the fuel injection port.

Technical effects of the disclosed embodiments include causing an inert gas injected downstream of a fuel injection port formed into a wall of a turbine section to flow into and at least partially occupy a region downstream of the fuel injection port. The presence of the inert gas in the region downstream of the fuel injection may mitigate ignition of the inject fuel near a surface of the wall of the turbine section, thereby avoiding a flame holding condition. In certain embodiments, an opening of the fuel injection port may be formed into a hump protruding from the surface. The hump causes the injected fuel to be lifted away from the surface of the wall and propelled into the flow path, where the fuel can be ignited by the combustion gases to increase gas turbine engine efficiency and performance.

The subject matter described in detail above may be defined by one or more clauses, as set forth below.

According to a first aspect, a system includes at least one component of a turbine section, the at least one component including: an inert gas port formed into a wall of the at least one component, wherein the inert gas port is configured to inject an inert gas into a chamber of the turbine section in a downstream direction; and a fuel port formed into the wall upstream of the inert gas port, wherein the fuel port is configured to inject a fuel in the downstream direction toward the injected inert gas.

The system of the preceding clause, wherein a first intersection of the inert gas port and a surface of the wall forms a first cross-section, a second intersection of the fuel port and the surface forms a second cross-section, and a distance spanning a first centroid of the first cross-section and a second centroid of the second cross-section is between two times a hydraulic diameter of the fuel port and one hundred times the hydraulic diameter.

The system of any preceding clause, wherein a first angle between a first central axis of the inert gas port and the surface is between 15 and 25 degrees, and a second angle between a second central axis of the fuel port and the surface is between 15 and 25 degrees.

The system of any preceding clause, including a hump protruding from a surface of the wall; wherein the wall is defined between successive circumferentially spaced airfoils of the turbine section; and wherein an opening of the inert gas port is disposed downstream of a crest of the hump, and an opening of the fuel port is disposed upstream of the crest.

The system of any preceding clause, wherein an upstream width dimension of an upstream side of the hump is larger than a downstream width dimension of a downstream side of the hump.

The system of any preceding clause, wherein a first angle between a first central axis of the inert gas port and the surface is between 0 and 10 degrees, and a second angle between a second central axis of the fuel port and the surface is between 15 and 25 degrees.

The system of any preceding clause, wherein the opening of the inert gas port includes an inert gas slot, wherein the inert gas slot includes: a vertical portion extending crosswise to the surface into an interior of the hump; and a downstream portion fluidly coupled to the vertical portion and the opening of the inert gas slot, wherein the downstream portion extends crosswise relative to the vertical portion in the downstream direction.

The system of any preceding clause, wherein the chamber is disposed between successive circumferentially spaced airfoils of the turbine section.

The system of any preceding clause, wherein the successive circumferentially spaced airfoils include blades, vanes, or a combination thereof.

The system of any preceding clause, wherein the wall of the at least one component includes a blade wall of at least one of the blades, a vane wall of at least one of the vanes, an inner diameter wall of the turbine section, an outer diameter wall of the turbine section, or a combination thereof.

The system of any preceding clause, wherein a first pressure ratio of the fuel is between 1.5 and 1.7, and a second pressure ratio of the inert gas is between 1.0 and 1.2.

The system of any preceding clause, wherein the inert gas includes carbon dioxide, nitrogen, argon, recirculated exhaust gas, or a combination thereof, and the fuel includes methane, natural gas, syngas, hydrogen, ammonia, or a combination thereof.

According to a second aspect, a system includes a turbine section including circumferentially spaced airfoils; at least one component of the turbine section including: an inert gas port formed into a wall of the at least one component, wherein the inert gas port is configured to direct an inert gas between successive circumferentially spaced airfoils of the turbine section in a downstream direction; and a fuel port formed into the wall upstream of the inert gas port, wherein the fuel port is configured to inject a fuel between the successive circumferentially spaced airfoils in the downstream direction toward the injected inert gas; wherein the inert gas port and the fuel port are disposed between the successive circumferentially spaced airfoils.

The system of the preceding clause, including a hump protruding from a surface of the wall; wherein the wall is defined between successive circumferentially spaced airfoils of the turbine section; and wherein an opening of the inert gas port is disposed downstream of a crest of the hump, and an opening of the fuel port is disposed upstream of the crest.

The system of any preceding clause, wherein a first sign of a first curvature of lateral sides of the hump matches a second sign of a second curvature of lateral surfaces of the successive circumferentially spaced airfoils.

The system of any preceding clause, wherein a first intersection of the inert gas port and a surface of the wall forms a first cross-section, a second intersection of the fuel port and the surface forms a second cross-section, and a distance spanning a first centroid of the first cross-section and a second centroid of the second cross-section is between two times a hydraulic diameter of the fuel port and one hundred times the hydraulic diameter.

The system of any preceding clause, wherein a first angle between a first central axis of the inert gas port and a surface of the wall is between 15 and 25 degrees, and a second angle between a second central axis of the fuel port and the surface is between 15 and 25 degrees.

According to a third aspect, a method includes: injecting an inert gas from an inert gas port formed into a wall of at least one component of a turbine section; injecting a fuel in a downstream direction toward the injected inert gas from a fuel port formed into the wall; and causing the injected inert gas to occupy at least a portion of a region downstream of the fuel port and adjacent to the wall.

The method of the preceding clause, wherein a portion of the fuel port and a portion of the inert gas port are formed into a hump protruding from a surface of the wall.

The method of any preceding clause, wherein an opening of the inert gas port is disposed downstream of a crest of the hump, and an opening of the fuel port is disposed upstream of the crest.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   at least one component of a turbine section comprising:
      an inert gas port formed into a wall of the at least one component, wherein the inert gas port is configured to inject an inert gas into a chamber of the turbine section in a downstream direction;
      a fuel port formed into the wall upstream of the inert gas port, wherein the fuel port is configured to inject a fuel in the downstream direction toward the injected inert gas; and
      a hump protruding from a surface of the wall, wherein an opening of the inert gas port is disposed downstream of a crest of the hump, and an opening of the fuel port is disposed upstream of the crest.

2. The system of claim 1, wherein a first intersection of the inert gas port and the surface forms a first cross-section, a second intersection of the fuel port and the surface forms a second cross-section, and a distance spanning a first centroid of the first cross-section and a second centroid of the second cross-section is between two times a hydraulic diameter of the fuel port and one hundred times the hydraulic diameter.

3. The system of claim 1, wherein a first angle between a first central axis of the inert gas port and the surface is between 15 and 25 degrees, and a second angle between a second central axis of the fuel port and the surface is between 15 and 25 degrees.

4. The system of claim 1, wherein the wall is defined between successive circumferentially spaced airfoils of the turbine section.

5. The system of claim 1, wherein the opening of the fuel port is at least partially formed into an upstream portion of the hump.

6. The system of claim 1, wherein the opening of the inert gas port is at least partially formed into a downstream portion of the hump.

7. The system of claim 1, wherein the inert gas port comprises:
   a vertical portion extending crosswise to the surface into an interior of the hump; and
   a downstream portion fluidly coupled to the vertical portion and the opening of the inert gas port, wherein the downstream portion extends crosswise relative to the vertical portion in the downstream direction.

8. The system of claim 1, wherein the chamber is disposed between successive circumferentially spaced airfoils of the turbine section.

9. The system of claim 8, wherein the successive circumferentially spaced airfoils comprise blades, vanes, or a combination thereof.

10. The system of claim 9, wherein the wall of the at least one component comprises a blade wall of at least one of the blades, a vane wall of at least one of the vanes, an inner diameter wall of the turbine section, an outer diameter wall of the turbine section, or a combination thereof.

11. The system of claim 1, wherein a first pressure ratio of the fuel is between 1.5 and 1.7, and a second pressure ratio of the inert gas is between 1.0 and 1.2.

12. The system of claim 1, wherein the inert gas comprises carbon dioxide, nitrogen, argon, recirculated exhaust gas, or a combination thereof, and the fuel comprises methane, natural gas, syngas, hydrogen, ammonia, or a combination thereof.

13. A system, comprising:
   a turbine section including circumferentially spaced airfoils;
   at least one component of the turbine section comprising:
      an inert gas port formed into a wall of the at least one component, wherein the inert gas port is configured to direct an inert gas between successive circumferentially spaced airfoils of the turbine section in a downstream direction;
      a fuel port formed into the wall upstream of the inert gas port, wherein the fuel port is configured to inject a fuel between the successive circumferentially spaced airfoils in the downstream direction toward the inert gas; and
      a hump protruding from a surface of the wall, wherein an opening of the inert gas port is disposed downstream of a crest of the hump, and an opening of the fuel port is disposed upstream of the crest.

14. The system of claim 13, wherein the wall is defined between the successive circumferentially spaced airfoils of the turbine section.

15. The system of claim 13, wherein a first sign of a first curvature of lateral sides of the hump matches a second sign of a second curvature of lateral surfaces of the successive circumferentially spaced airfoils.

16. The system of claim 13, wherein a first intersection of the inert gas port and the surface forms a first cross-section, a second intersection of the fuel port and the surface forms a second cross-section, and a distance spanning a first centroid of the first cross-section and a second centroid of the second cross-section is between two times a hydraulic diameter of the fuel port and one hundred times the hydraulic diameter.

17. The system of claim 13, wherein a first angle between a first central axis of the inert gas port and the surface is between 15 and 25 degrees, and a second angle between a second central axis of the fuel port and the surface is between 15 and 25 degrees.

18. A method, comprising:
   injecting an inert gas from an inert gas port formed into a wall of at least one component of a turbine section;
   injecting a fuel in a downstream direction toward the injected inert gas from a fuel port formed into the wall, wherein an opening of the inert gas port is disposed downstream of a crest of a hump protruding from a surface of the wall, and an opening of the fuel port is disposed upstream of the crest; and
   causing the injected inert gas to occupy at least a portion of a region downstream of the fuel port and adjacent to the wall.

19. The method of claim 18, wherein a portion of the fuel port and a portion of the inert gas port are formed into the hump.

20. The method of claim 18, wherein the wall is defined between successive circumferentially spaced airfoils of the turbine section.

* * * * *